United States Patent [19]

Henning et al.

[11] Patent Number: 4,867,026

[45] Date of Patent: Sep. 19, 1989

[54] METAL SLITTING SAWS WITH IMPROVED CUTTING TEETH

[75] Inventors: Klaus Henning; Jörg Maurer, both of Reutlingen, Fed. Rep. of Germany

[73] Assignee: Gustav Wagner Maschinenfabrik GmbH & Co. KG, Reutlingen, Fed. Rep. of Germany

[21] Appl. No.: 160,167

[22] Filed: Feb. 25, 1988

[30] Foreign Application Priority Data

Apr. 3, 1987 [DE] Fed. Rep. of Germany ....... 3711228

[51] Int. Cl.$^4$ .............................................. B23D 61/04
[52] U.S. Cl. ...................................... 83/835; 83/837; 83/839; 83/854; 83/855
[58] Field of Search .................. 83/184, 835, 54, 848, 83/854, 839, 855, 837; 407/56, 61

[56] References Cited

U.S. PATENT DOCUMENTS

| 298,886 | 5/1884 | Peak | 83/835 |
| 4,604,933 | 8/1986 | Lesher et al. | 83/839 |
| 4,690,024 | 9/1987 | Chaconas | 83/835 |

FOREIGN PATENT DOCUMENTS 2931965  8/1979  Fed. Rep. of Germany .

Primary Examiner—Donald R. Schran
Attorney, Agent, or Firm—Burgess, Ryan & Wayne

[57] ABSTRACT

A cutting tooth, viz. roughing tooth (2) and finishing tooth (3) made from cutting metal for a metal slitting saw, especially a circular disk saw, the geometry of said tooth being determined by the primary clearance angle (α), the rake angle (γ), the radial clearance angle (β), the tangential untoleranced dimension (s-e) and a tangential land (12) on the finishing tooth (3) with a negative relief angle (ε), in which for both the roughing tooth (2) and the finishing tooth (3) the cutting edge (7; 7′, 7″) is stabilized by a negative land (5; 5′, 5″), and in which the angle (χ) between land and chip breaker face (4) is about 190° to 240°, especially about 205° to 230°.

22 Claims, 3 Drawing Sheets

METAL SLITTING SAWS WITH IMPROVED CUTTING TEETH

The present invention relates to a cutting tooth, especially a roughing and a finishing tooth, preferably made from cutting metal, for a metal slitting saw, especially a circular saw blade; and to a metal slitting saw, especially a circular saw blade equipped with such cutting teeth.

Circular saw blades comprising circumferentially alternatingly disposed roughing and finishing teeth which are fixed by brazing in corresponding pockets of the saw blade and are respectively formed of cutting metal, are generally known (DE-A-No. 2,838,424). The respective rake angles of the roughing and the finishing teeth are negative so as to minimize the bending moment and the tensile stress at the tool face and thus the load acting thereon.

As a further possibility of reducing loads acting on the teeth it has also been known additionally to provide one or several chip parting grooves which respectively terminate with their rear ends in the primary flank of the cutting tooth. In this respect reference is made, inter al., to DE-A-No. 2,931,965.

Finally, it as also been known for the purpose of stabilizing the cutting edge to subdivide the latter into a primary cutting edge and two secondary cutting edges laterally adjacent thereto, whereby a primary tool face and two secondary tool faces are formed correspondingly, the angles of inclination of the latter being negative relative to the primary tool face for the reasons set out above (FR-A-No. 2,231,463).

The known designs are satisfactory for cutting plain or low-alloy steels; in any case they are better than metal slitting saws having SS-type cutting teeth.

High-alloy steels such as X 20 Cr 13 cannot economically be cut with the known designs. When conventional roughing and finishing teeth made from cutting metal are used, these will be worn within a relatively short period of time and the saw blade will then be useless. The forces acting on the cutting edge and the tool face during sawing of high-alloy steels, and the temperatures prevailing in the material of the workpiece and the cutting tool probably are the cause of increased wear. The wear of the tool face due to diffusion is especially severe; this is promoted by extremely high temperatures in the flow layer on the underside of the chips relative to the shear plane and the cutting edge. Cratering on the tool face and breakage of the cutting edge will occur within a very short time. Such wear renders the sawing of high-alloy steels uneconomical. For this reason workpieces such as pipes or sectional bars of high-alloy steel are cut, for instance, by welding torches or slit by HSS-type saw blades. But this kind of cutting process is likewise extremely uneconomical.

There is thus a great demand for the development of cutting teeth or metal slitting saws provided with such teeth by means of which even high-alloy steels can be slit or sawn economically.

BRIEF DESCRIPTION OF THE INVENTION

It is therefore the object of the present invention to provide cutting teeth, especially roughing and finishing teeth, for metal slitting saws, especially for circular The cutting teeth, of the present invention for cutting metal comprise teeth characterized by the geometry of said cutting tooth being determined by the primary clearance angle ($\alpha$), the rake angle ($\gamma$), the radial clearance angle ($\beta$), the tangential untoleranced dimension (s−e), and a tangential land (12) on the finishing tooth (3) with a negative relief angle ($\epsilon$), characterized in that the cutting edge (7, 7', 7'') is stabilized by a negative land (5, 5', 5''), the angle ($\chi$) between land and chip breaker face (4) being about 190° to 240°, especially about 205° to 230°.

The butting teeth, of the present invention for cutting metal comprise teeth characterized in that the geometry of said cutting tooth is determined by the primary clearance angle ($\alpha$), the rake angle ($\gamma$), the radial clearance angle ($\beta$), the tangential untoleranced dimension (s−e), and a tangential land (12) on the finishing tooth (3) with a negative relief angle ($\epsilon$), characterized in that the cutting edge (7, 7', 7'') is stabilized by a negative land (5, 5', 5''), the angle ($\chi$) between land and chip breaker face (4) being about 190° to 240°.

Due to the measures according to the present invention, a cutting edge of high stability is obtained. The wear of both the flank and the tool face due to diffusion as well as mechanical wear and scaling are minimum, also and precisely when high-alloy materials are sawn.

DETAILED DESCRIPTION OF THE INVENTION

The provision of a chip breaker face is of particular significance; thereby the curling diameter of the chip is considerably reduced so that the chip will drop automatically from the corresponding tooth space and also a smaller tooth space resulting in shorter cutting times is possible. This also does away with the usual cleaning of tooth spaces to remove jammed chips. Therefore chip removal is considerably improved.

When the tool face is concavely curved it is moreover possible to considerably reduce the surface pressure and thus the wear due to diffusion in the critical zone of the chip breaker face, whereby the cutting edge is additionally stabilized and a longer life can be achieved.

Preferably, the tangential land of the finishing tooth has a width which is at most equal to the width of the negative land and preferably is smaller than the width thereof. It is thereby ensured that a positive land angle, which might result in corner breakage, is not formed in the corner zone of the cutting edge.

Preferably, the chip breaker face has a uniform depth across the entire width thereof, so that a chip curling radius of constantly equal size is obtained.

The embodiment of FIGS. 8 and 9 are preferred in case of extreme cutting conditions, for instance when inhomogeneous workpieces such as workpieces containing shrinkholes or the life are to be sawn.

A circular disk saw is provided with the teeth disposed about the periphery between a zero angle and a positive angle (tooth seat angle $\eta$) based on the center to center plane of the saw blade. The angle is not larger than about +30° and preferably about +10° (See FIG. 5). Teeth of this design are especially advantageous for grinding or regrinding the cutting teeth because the grinding or regrinding operation is effected into the cutting body; it is therefore possible for the cutting teeth to be reground several times while critical weakening need not be feared.

Below, embodiments of the design in accordance with the present invention will be described in detail with reference to the accompanying drawing, in which FIG. 1 is a schematic side view of a portion of a circular saw blade having hard-metal cutting teeth, i.e. roughing and finishing teeth in accordance with the invention;

Figure 1:
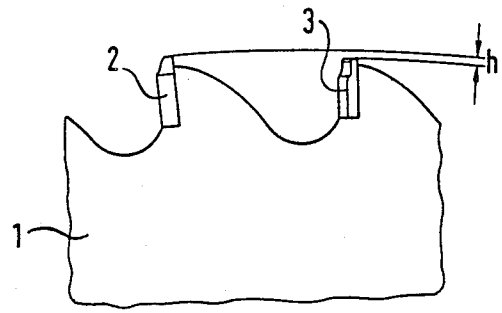

FIG. 1 is a view at a reduced scale showing a portion of a circular saw blade 1 having roughing teeth 2 and finishing teeth 3 alternatingly provided about the periphery thereof, the cutting edges of said teeth being formed on cutting-metal inserts which are secured in pockets by brazing. The roughing teeth project radially beyond the finishing teeth 3 by a predetermined amount "h" at a conventional order of magnitude.

Figure 3:
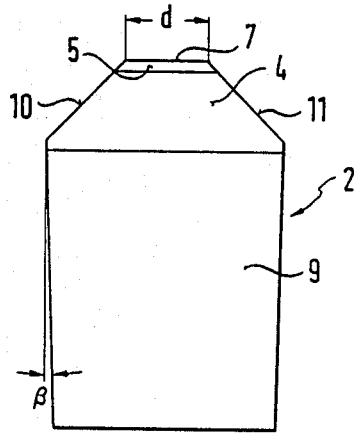
FIG. 3 is a front view of the roughing tooth of FIG. 2.
Figure 2:
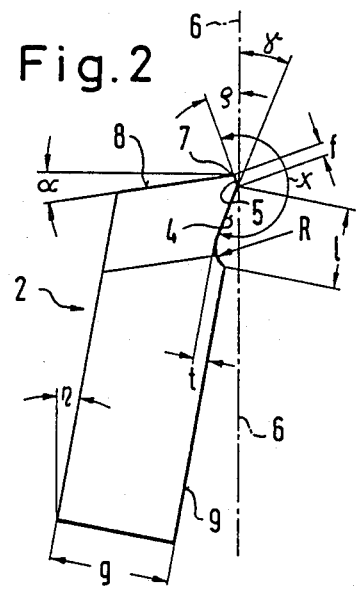
FIG. 2 is an enlarged side view showing a roughing tooth in accordance with the invention.
Figure 4:
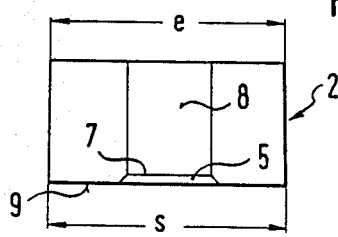
FIG. 4 is a plan view of the roughing tooth of FIGS. 2 and 3.

As illustrated in FIGS. 2 to 4, a first embodiment of a roughing tooth 2 in accordance with the present invention is defined by a primary clearance angle $\alpha$, a positive rake angle $\gamma$, a radial clearance angle (, a tangential untoleranced dimension (s-e), a chip breaker face 4, and a negative land 5. The angle $\chi$ between the land 5 and the chip breaker face 4 is between about 190° and 240°, especially about 205° to 230°, and is 210° in the illustrated embodiment. The relief angle $\rho$ is negative—based on the centre plane 6 of the saw blade—and amounts to about −10° to −30°, especially −15° to −25°, it is −14° in the illustrated embodiment. The rake angle $\gamma$ is positive—based on the centre plane 6 of the saw blade—and amounts to about +10° to +30°, it is +16° in the illustrated embodiment.

$\eta$ is the angle at which the tooth is seated in the saw blade. Based on the centre plane of the saw blade, this angle is positive in the illustrated embodiment and amounts to 20°. It may be up to 30° based on the centre plane of the saw blade.

The radial clearance angle $\beta$ (see FIG. 3) is between 0.5° and 2.5°, preferably about 1.0° to 1.5°. This angle is a per se known parameter. Similar considerations apply to the tangential untoleranced dimension (s−e), which may be about 0.03 to 0.15 mm.

The chip breaker face 4 of the roughing tooth 2 is trapezoidal when viewed from the front, as will be apparent from FIG. 3, the primary cutting edge 7 being formed on the minor base line. The cutting edge 7 is defined by the intersection line between the negative land 5 and the primary flank 8. The width "d" of primary flank is about ⅓ of the maximum width of the roughing tooth. The thickness "g" of the roughing tooth is about half the maximum width "s" or ⅓ thereof.

The width "f" of the negative land 5 is at least 0.1 mm; but at a maximum it corresponds to five times the chip thickness, preferably to about 1.0 to 2.0 times the chip thickness. In the illustrated embodiment the width "f" of the land is about 0.4 mm.

The length "1" of the chip breaker face 4 is between 0.1 and 5.0 mm or, respectively, at most up to ½ of the spacing, in the illustrated embodiment it is 3.0 mm. The depth "t" of the chip breaker face amounts to about 0.1 to 0.6 mm or, respectively, at most up to ¼ of the spacing, preferably to 0.2 to 0.4 mm, it is about 0.45 mm in the illustrated embodiment.

The transition between the chip breaker face 4 and the breast face 9 of the cutting tooth is concave in plan view, the radius of curvature "R" being up to ½ of the spacing.

Adjacent the centrally arranged primary cutting edge 7, which is formed between the primary flank 8 and the negative land 5, secondary cutting edges 10 and 11 are laterally provided which relative to the primary cutting edge 7 extend at an inclination and thereby form a trapezoidal contour of the chip breaker face (FIG. 3).

Figure 6:
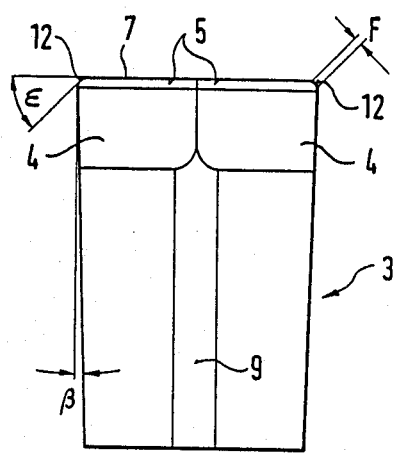
FIG. 6 is a front view of the finishing tooth of FIG. 5.
Figure 5:
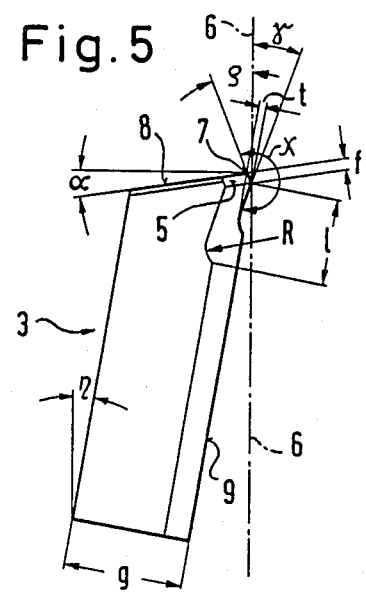
FIG. 5 is an enlarged side view of a finishing tooth accordance with the present invention.
Figure 7:
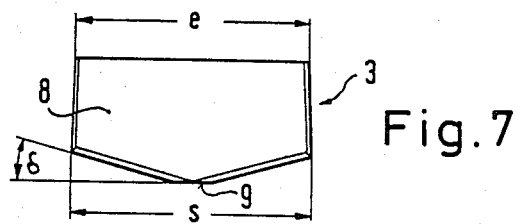
FIG. 7 is a plan view of the finishing tooth of FIGS. 5 and 6, respectively.

The FIGS. 5 to 7 illustrate a first embodiment of a finishing tooth, the illustration corresponding to that of FIGS. 2 to 4. Those design features already explained with respect to the roughing tooth and also provided with the finishing tooth shown in FIGS. 5 to 7 are referenced identically, the angles $\alpha$, $\rho$, $\gamma$, $\eta$, $\beta$ being dimensioned similarly to the corresponding angles of the described roughing tooth. The same applies to the dimension of the chip breaker face 4 and the width "f" of the negative land 5. The tangential untoleranced dimension (s−e) also corresponds to that of the roughing tooth. Finally, the external dimensions of the finishing tooth 3, i.e. height, width and thickness, also correspond to those of the described roughing tooth 2.

The clearance angle $\alpha$ of both roughing tooth 2 and finishing tooth 3 is about 5° to 12°, preferably about 7° to 9°.

The finishing tooth shown in FIGS. 5 to 7 differs from the roughing tooth 2 shown in FIGS. 2 to 4 first by the feature that the chip breaker face 4 inclusive of the negative face 5 and the breast face 9 is obtuse, and secondly by the formation of tangential lands 12 having a land width "F" and a negative relief angle $\epsilon$ of 20° to 60°, preferably about 30°. The width of the tangential land 12 is at most equal to, and preferably less than, the width "f" of the negative land 5 which in the case of the finishing tooth extends respectively across the entire width of the chip breaker face 4, i.e. extends respectively right to the two tangential lands 12.

The obtuse configuration of both the chip breaker face 4 and the breast face 9 is defined by the negative inclination $\delta$ (see FIG. 7), which amounts to about 10° to 30°, preferably about 17°. As will be apparent from FIG. 4, the angle $\delta$ is zero in the case of the roughing tooth shown in FIGS. 2 to 4.

On account of the obtuse configuration of the breast face 9 corresponding to the obtuse configuration of the chip breaker face 4 it is ensured that the geometry, especially the depth "t", of the chip breaker face 4 does not vary across the entire width of the finishing tooth 3. In this connection it should be observed that the finish-cut takes place in particular in the marginal region of the finishing tooth so that it is chiefly there that the predetermined geometry of the chip breaker face 4 must be maintained.

Figure 8:
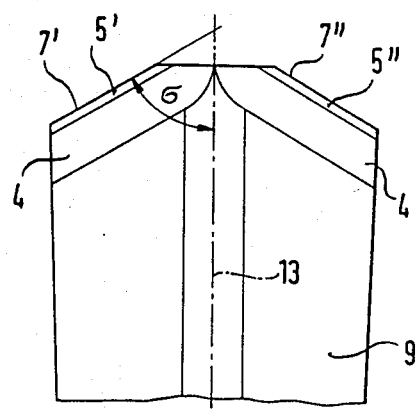
FIG. 8 is a front view of a modified embodiment of a finishing tooth in accordance with the invention.
Figure 9:
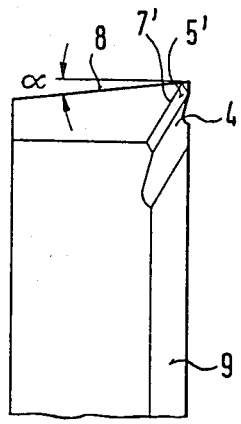
FIG. 9 is a side view showing the finishing tooth of FIG. 8.

FIGS. 8 and 9 illustrate in a front and a side view a modified embodiment of a finishing tooth; this embodiment differs from that shown in FIGS. 5 to 7 in that the cutting edge has a negative land 5', 5" associated therewith only in the two effective marginal regions, and that the corresponding "marginal cutting edges" 7', 7" are inclined towards the centre plane 13 of the cutting body which extends in parallel to the plane of division or defines the same, respectively. Correspondingly, the chip breaker faces 4 are inclined towards the centre plane 13 of the cutting body. This embodiment of the finishing tooth is especially suited for coping with extreme cutting conditions, e.g. for sawing inhomogeneous workpieces, for instance workpieces containing shrinkholes or the like. Preferably, negative tangential faces are also provided in this embodiment.

Of course, it may be sufficient also in the case of the embodiment of the finishing tooth illustrated in FIGS. 5 to 7 to associate a respective negative face only to the two effective marginal regions of the cutting edge 7. The additional inclination of the marginal cutting edges inclusive of the negative face in accordance with FIGS. 8 and 9 is of especial advantage only for extreme cutting conditions, as explained above.

The inclination angle of the marginal cutting edges 7', 7" inclusive of the negative faces 5', 5" relative to the centre plane 13 of the cutting body is about 35° to 80°, especially about 45° to 70°, in particular about 60°. This inclination angle is referenced $\sigma$ in FIG. 8.

Figure 10:
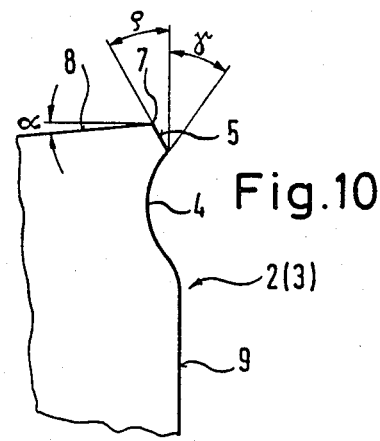
FIGS. 10 to 12 are partial side views of further modifications of a cutting tooth in accordance with the present invention.
Figure 11:
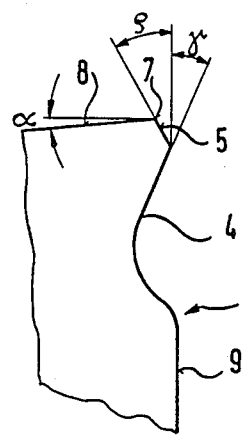
Figure 12:
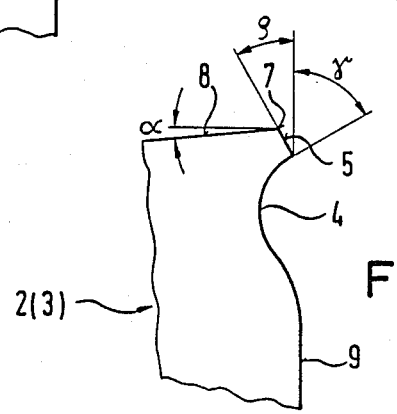

FIGS. 10 to 12 illustrate schematically some modifications of the chip breaker face, wherein concave chip breaker faces are respectively concerned. In the embodiment shown in FIG. 10 the radius of curvature is approximately constant across the entire chip breaker face. In the embodiment shown in FIG. 11 the radius of curvature of the chip breaker face progressively decreases away from the negative face 5. The embodiment illustrated in FIG. 12 shows the opposite case.

The embodiments according to FIGS. 10 to 12 are suited for both the roughing and the finishing teeth 2 and 3, respectively.

Figure 13:
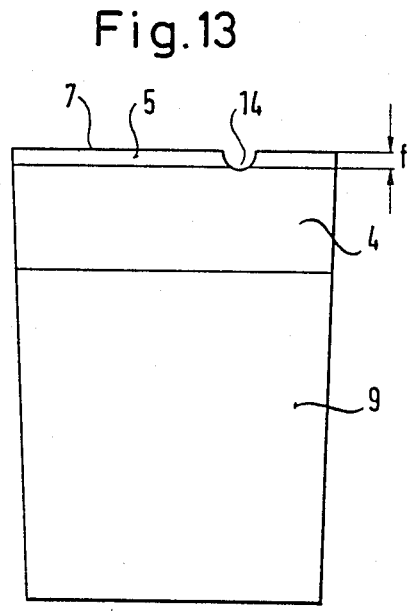
FIG. 13 is a front view of a cutting tooth in accordance with the invention comprising a chip breaker face, a negative land, and a chip parting groove.
Figure 14:
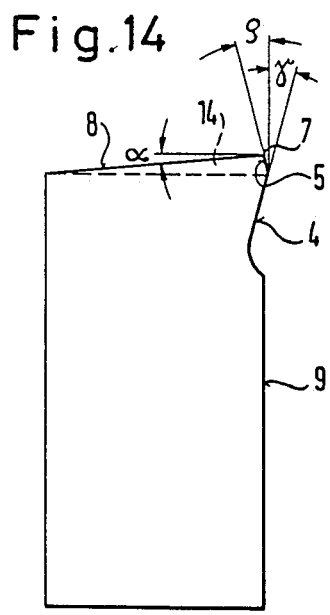
FIG. 14 is a side view of the cutting tooth of FIG. 13.

The embodiments shown in FIGS. 13 and 14 are distinguished over the above-described embodiments im that additionally a chip parting groove 14 is provided the rear end of which opens into the primary flank 8. This is a per se known measure for parting the chip. But this measure is not known in combination with the above-described geometry of roughing tooth 2 and finishing tooth 3.

The cutting edge geometry in accordance with the present invention is suited for both circular disk saws and band saws. In an extreme case, cutting teeth of corresponding design may be an integral part of a circular saw blade. But normally they are permanently secured, for instance by brazing, in pockets disposed about the periphery of a circular saw blade. Basically, however, it is also conceivable to secure the cutting teeth by clamping provided the circular saw blade has a proper thickness. In that case the cutting teeth have the above-described geometry right from the start. If applicable, regrinding may be necessary after assembly by clamping.

All of the features disclosed in the present documents are claimed as essential for the invention to the extent to which they are novel over the prior art either individually or in combination, the emphasis of the invention being in the field of circular saw blades.

We claim:

1. A radially extending cutting insert for a tooth of a circular saw blade of a metal cutting saw, which rotates in a forward direction, comprising:
   (a) a forward breast face,
   (b) a forward chip breaker face radially outward extending above said breast face and connected therewith,
   (c) a forward negative land radially outward extending above said chip breaker face and connected therewith,
   (d) an upper primary flank extending rearwardly from and connected with the top of said negative land,
   (e) a cutting edge defined by the intersection of said negative land and said chip breaker face, with said cutting edge being stabilized by said negative land;
   (f) an angle defined between said negative land and said chip breaker face in the range of approximately 190°–240°, and
   (g) said insert having a geometry determined by:
      (i) a rake angle ($\gamma$) defined between said chip breaker face and a first radial plane extending from the center of said circular saw blade to said cutting edge;
      (ii) a primary clearance angle ($\beta$) defined between said upper primary flank and a tangential plane perpendicular to said first radial plane;
      (iii) a radial clearance angle ($\beta$) defined between a side edge of said tooth adjacent said breast face and a second radial plane; and
      (iv) a tangential untoleranced dimension (s−e) defined as a width of said tooth.

2. A insert according to claim 1 wherein said angle defined between such negative land and said chip breaker face is in the range of approximately 205° to 230°.

3. A cutting insert according to claim 1, wherein said cutting tooth has a geometry further determined by an angle ($\rho$) of the negative land with respect to the first radial plane of the saw blade is in the range of approximately −10° to −30°.

4. A cutting insert according to claim 3, wherein said angle of the negative land is in the range of approximately −15° to −25°.

5. A cutting insert according to claim I, wherein the rake angle is in the range of approximately +10° to −30 .

6. A cutting insert according to claim 1, wherein said negative land has a minimum width of 0.1 mm and a maximum width equal to 5 times the thickness of the tooth.

7. A cutting insert according to claim 6, wherein the width of the negative land is in the range of approximately 1.0 to 2.0 times the thickness of the tooth.

8. A cutting insert according to claim 1, wherein said chip breaker face is concave.

9. A cutting insert according to claim 1, wherein said chip breaker face is planar.

10. A cutting insert according to claim 1, wherein said chip breaker face has a depth (t) in the range of approximately 0.1 to 0.6 mm, a length (1) in the range between approximately 0.1 to 5.0 mm and a radius of transition (R) connected with said breast face, said radius of transition being in the range of approximately 0.1 to 3.0 mm.

11. A cutting insert according to claim 1, wherein said chip breaker face is curved and has a constant radius of curvature.

12. A cutting insert according to claim 1, wherein said chip breaker face is curved and has a radius of curvature which progressively changes away from the negative land.

13. A cutting insert according to claim 1, further including a tangential land on the finishing tooth having a negative release angle ($\epsilon$) with respect to a horizontal plane, and said tangential land has a width which, at a maximum, is equal to the width of the negative land.

14. A cutting insert according to claim 13, wherein the release angle ($\epsilon$) of the tangential land is in the range of approximately 20° to 60°.

15. A cutting insert according to claim 14 wherein the release angle ($\epsilon$) of the tangential land is in the range of approximately 30° to 50°.

16. A cutting insert according to claim 1, wherein said cutting tooth is permanently secured to said saw blade.

17. A cutting insert according to claim 1, wherein said cutting tooth is detachably secured to said saw blade.

18. A cutting insert according to claim 1, wherein said chip breaker face includes two outer partial faces obtusely inclined rearwardly, and at least a region of said breast face of the cutting tooth which is immediately contiguous with the chip breaker face corresponds in shape thereto.

19. A cutting insert according to claim 18, wherein said inclined portions of the chip breaker face are inclined at an angle of inclination ($\delta$) relative to a reference plane extending parallel to the breast face in the range of approximately $-5°$ to $-30°$.

20. A cutting insert according to claim 19, wherein said angle of inclination ($\delta$) is in the range of approximately $-10°$ to $-20°$.

21. A cutting insert according to claim 1, further including at least one chip parting groove having a rear end which opens into the primary flank.

22. A cutting insert according to claim 1, wherein said cutting edge, inclusive of the negative land, includes at least two outer portions which are inclined towards the central plane of the saw blade.

* * * * *